IMPROVEMENT IN THE CATALYTIC OXIDATION OF TETRACHLOROETHANE

Robert E. Feathers, New Martinsville, and Roy H. Rogerson, Moundsville, W. Va., assignors, by mesne assignments, to Pittsburgh Plate Glass Company
No Drawing. Filed Sept. 29, 1959, Ser. No. 843,079
6 Claims. (Cl. 260—654)

The present invention relates to the production of unsaturated chlorinated hydrocarbons. More particularly, the present invention relates to the catalytic reaction of symmetrical tetrachloroethane to produce perchloroethylene.

The reaction of symmetrical tetrachloroethane and oxygen at elevated temperatures in the presence of a catalyst is well known in the art and may be conveniently illustrated by the following formula:

$$C_2H_2Cl_4 + 1/2 O_2 \text{ yields } H_2O + C_2Cl_4$$

During this reaction, apparently due to cracking of the symmetrical tetrachloroethane feed, considerable quantities of trichloroethylene are also produced. Both perchloroethylene and trichloroethylene are valuable solvents, being widely used in the dry cleaning industry, vapor phase degreasing operations and other similar applications. Production of trichloroethylene and perchloroethylene during the catalytic oxidation hereinabove described therefore provides a convenient method of obtaining both of these valuable solvents in a single process.

During the catalytic oxidation of symmetrical tetrachloroethane hereinabove referred to, burning of the feed streams often occurs rendering the process not completely satisfactory. Thus, burning of the symmetrical tetrachloroethane feed reduces the quantities of perchloroethylene and trichloroethylene products obtainable and quite frequently causes plugging of reactors. Burning of the chlorinated hydrocarbon feed represents a serious economic loss. In addition, burning of the feed material raises the bed temperatures of the reactors employed giving rise to hot spots which can impair catalyst activity in the oxidation reaction.

According to the present invention, it has been found that the above enumerated difficulties normally encountered in the production of perchloroethylene by the catalytic reaction of oxygen and symmertical tetrachloroethane may be avoided or completed obviated. Thus, in the production of perchloroethylene and trichloroethylene by the catalytic oxidation of symmetrical tetrachloroethane, high yields of both desirable products are obtained with little or no loss of the symmetrical tetrachloroethane feed occurring during reaction. Also bed temperatures during the reaction are controlled within tolerable limits.

In accordance with this invention, it has been found that by reacting symmetrical tetrachloroethane and oxygen at elevated temperatures in the presence of a catalyst, burning can be reduced considerably by introducing into the symmetrical tetrachloroethane-oxygen feed stream a quanity of a higher chlorinated saturated hydrocarbon representing between 5 and 50 percent by weight of the chlorinated hydrocarbon feed. Introduction of higher chlorinated saturated hydrocarbons to symmetrical tetrachloroethane feed streams employed to produce perchloroethylene and trichloroethylene by catalytic oxidation reduces considerably the burning normally encountered during such reactions and contributes to the control of bed temperatures.

The catalyst utilized in accordance with this invention is in the form of a particulate composition composed of a carrier material containing thereon metal halides, preferably as chlorides such as zinc, copper, magnesium, iron and the like and mixtures thereof. Many materials may be employed as carriers for the metal chloride catalyst utilized. Thus, materials such as alumina, alumina gels, silica, silica gels, calcium silicate, diatomaceous earth, infusorial earth, pumice, and kieselguhr, fuller's earth, and other like materials may be conveniently employed. A particularly effective carrier is a calcined diatomaceous earth sold by the Johns-Manville Corporation under the trade name Celite.

The configuration of the carrier particles employed is susceptible to wide variation and they may be spherical, cylindrical or irregular in shape. Celite pellets employed in the preferred embodiments of this invention are generally cylindrical in shape, the particles being extruded in manufacture to conform to a uniform diameter and cut in various length as desired.

Where fluid bed operations are contemplated, the carrier material employed is typically between 10 and 150 mesh measured on Tyler standard screen scale sieves. This indicates that the particles pass through a 10 mesh screen and are caught on a 150 mesh screen. The carrier itself may be varied. In fluid bed operation Florex, a calcined fuller's earth manufactured by the Floriden Corporation, has been found particularly suitable.

The catalytic chloride salts supported or otherwise contained in the carrier particles may be placed therein utilizing any well known method. Thus, carrier particles immersed in a solution containing the catalytic chloride salts may be one method of placing the catalyst material on the carrier. If desired, solutions containing the active chlorides may be sprayed on catalyst particles and then dried. In fact, any method which will effectively deposit upon the carrier used the required quantities of metal chloride salts may be employed.

A particularly suitable catalyst composition utilized in the herein described process is prepared by impregnating or coating or otherwise placing on a carrier particle a mixture of zinc and copper chlorides in amounts ranging from at least 5 percent up to 45 percent by weight of the catalyst particle. The ratio of the various constituents of the chloride mixture employed as catalyst is maintained within certain limits. Thus, the amount of copper chloride used in the catalyst composition in such that the ratio of copper chloride to the zinc chloride is maintained between 1 to 3.5 moles of copper chloride per mole of zinc chloride employed. It is found that the chloride catalyst, utilized on a carrier particle in weight percentages of the above range and whose constituents are maintained within the above set forth ratios is an extremely active catalyst for the production of perchloroethylene and trichloroethylene in reactions involving symmetrical tetrachloroethane and oxygen at elevated temperatures.

The reaction of symmetrical tetrachloroethane and oxygen in the presence of a catalyst to produce perchloroethylene is normally conducted in tubular reactors having located therein a catalyst bed. The reactors utilized may be stainless steel, nickel, or other structural material coated or uncoated of varying lengths and diameter. Typically, diameters of tubular reactors employed in this process may range from ½ inch to 6 inches. Similarly, reactor lengths are considerably variable and may range, for example, from 2 feet to as long as 30 feet. Recourse may also be had to turbulent bed reactors and the process adapted to a fluidized bed operation.

The reactant gases, that is, tetrachloroethane and oxygen, are preferably passed unidirectionally through the reactors and over the catalyst beds contained therein at rates such that considerable variation may obtain in the contact time. Contact times of 1 to 30 seconds may be employed though generally feed rates are regulated so that the contact times range between 3 and 20 seconds. While it is preferable to pass reactant gases together into the reactors, it is of course permissible to pass them in separately and at different points. Velocities of the gases are similarly adjusted in fluid bed operations to provide for fluidization of the bed upon start-up and they are then regulated to provide contact times in the above ranges.

In addition considerable variation in temperatures utilized in accordance with the practice of this invention may be employed. Thus, temperatures ranging between 570° F. and 930° F., preferably between 680° F. and 850° F., are employed within the reactors for effective utilization of the catalyst. Hotspots are found in operations of this type in the catalyst bed and under normal conditions it is the hotspot temperature which is maintained within the temperature range above defined.

Reactors employed in accordance with this invention are usually jacketed and a material may be circulated through the reactor jacket at temperatures some 30° F. to 120° F. cooler than the temperature occurring in the hotspot zone of the catalyst bed. Preferably a heat transfer medium such as Dowtherm is placed in the reactor jacket where it is refluxed in a condenser and returned to the reactor jacket to accomplish the maintenance of the desired 30° F. to 120° F. temperature differential between the jacket and the hotspot temperature.

The symmetrical tetrachloroethane and oxygen fed to the reactors may be preheated by passing the gases separately through separate and distinct preheaters to bring them to a temperature close to operating reactor temperatures prior to introducing the feed gases to the reactor itself. If desired, a portion of the reactor tube may be utilized as a preheater by having packed therein ceramic rings or spent catalyst, that is, catalyst which is no longer capable of actively promoting the reaction of tetrachloroethane and oxygen or with any other suitable inert material which when heated will provide adequate heat exchange between the gases passing therethrough and the heated particles.

The ratio of oxygen to symmetrical tetrachloroethane fed to a system of the hereinabove described type is considerably variable but is preferably maintained in a range so that the oxygen supplied to the reactor is between 15 percent and 75 percent of the theoretical requirement of the tetrachloroethane feed. Greater quantities can be employed if desired and oxygen in theoretical quantities or greater utilized. Theoretical oxygen requirements as described in the specification and claims are the quantities of $O_2$ necessary to react with all the hydrogen atoms in the chlorinated hydrocarbon feed to produce water. Analysis of the feed streams will furnish information to enable one skilled in the art to determine the amount of oxygen necessary to react with all oxidizable hydrogen atoms contained in the feed gases. On obtaining this value, the moles of oxygen per mole of organic feed are then regulated to conform to the range above defined with respect to tetrachloroethane feed stream. Analysis and control of oxygen feed of course can be conducted continuously if desired. Oxygen in a relatively pure state is utilized although diluted oxygen such as air and/or oxygen enriched air are operative.

Products issuing from the reactor in accordance with this invention are collected, for example, by means of dry ice-acetone cold traps, carbon adsorption techniques or any other suitable recovery system.

Higher chlorinated saturated hydrocarbons utilized are generally chlorinated $C_2$ aliphatic hydrocarbons having 5 to 6 chlorine atoms present thereon. Typical of the higher chlorinated saturated hydrocarbon materials utilized in accordance with this invention for feeding to the symmetrical tetrachloroethane oxidation reaction are pentachloroethane and hexachloroethane. These materials may be utilized either alone or in combination. Generally, it is preferable to add a chlorinated hydrocarbon stream to the symmetrical tetrachloroethane undergoing oxidation which is composed predominantly of pentachloroethane. The quantities of higher saturated chlorinated hydrocarbons employed are usually maintained somewhere between 5 percent and 50 percent by weight of the total chlorinated hydrocarbons fed to the oxidation zone. Preferably, the higher chlorinated saturated diluents employed are added to the symmetrical tetrachloroethane stream introduced into the catalytic reaction zone in quantities ranging between 10 and 20 percent by weight of the chlorinated hydrocarbon feed. In adding higher chlorinated saturated hydrocarbon diluents to the symmetrical tetrachloroethane feed, it is preferable to regulate the additions so that the added higher chlorinated saturated diluents are composed of approximately 75 percent pentachloroethane the balance being hexachloroethane. The addition of the higher chlorinated saturated diluents may be accomplished by introducing the material into the reaction zone from a point of introduction distinct from the symmetrical tetrachloroethane feed or if desired premixing of the diluents may be accomplished with the feed material outside of the reaction zone. Similarly if desired all the reactants may be mixed outside of the zone with the oxygen and then introduced into the reactor after a preliminary preheating.

It is found in the operation of the processes hereinabove described utilizing an organic diluent comprised of higher chlorinated saturated aliphatic hydrocarbons that good yields of perchloroethylene and trichloroethylene are obtained with a minimum of burning of the symmetrical tetrachloroethane feed during the tetrachloroethane oxidation reaction.

The following examples are descriptive of the manner in which the teachings of the present invention may be utilized:

Example I

A cupric chloride-zinc chloride-calcium chloride catalyst solution was prepared by dissolving 110.8 grams of cupric chloride ($CuCl_2$) and 34.1 grams of zinc chloride ($ZnCl_2$) and 30.0 grams of calcium chloride ($CaCl_2$) in 200 milliliters of water. One thousand milliliters of Celite pellets (0.25 inch in diameter and approximately 0.275 inch in length) were placed in a rototumbler and the solution of chlorides sprayed on the particles. The catalyst was dried by evaporating most of the water from the mixture while mixing the pellets in the rototumbler and heating the catalyst at the same time.

Example II

A three-tube jacketed nickel reactor was employed. Each tube was 12 feet long with an internal diameter of 1½ inches. Each of the tubes was charged with 8 feet of catalyst prepared in the manner shown in Example I. The reactor feed was composed of tetrachloroethane, oxygen, and an organic dilute stream containing pentachloroethane. The mole ratio of tetrachloroethane to oxygen to pentachloroethane being 1 to 0.28 to 0.15. Reactor feed rates were adjusted to provide a contact time for the feed material in the reactor of about 15.5 seconds. The reactor jacket was maintained at a temperature of 720° F. during the experiments. Using these conditions, several runs were made in the reactor and the results are shown below in Table I:

TABLE I

| Run No. | Jacket Temp., °F. | Percent of Theoretical O₂ fed. | Contact Time | Mole Percent Recovery—Based on Tetrachloroethane | | |
|---|---|---|---|---|---|---|
| | | | | $C_2HCl_3$ | $C_2Cl_4$ | CO and $CO_2$ |
| 1 | 720 | 56.5 | 15.1 | 18.5 | 49.4 | 1.1 |
| 2 | 720 | 51.3 | 15.4 | 26.2 | 45.4 | 1.6 |
| 3 | 720 | 53.1 | 15.7 | 35.0 | 53.9 | 1.7 |
| 4 | 720 | 53.5 | 15.7 | 31.8 | 51.4 | 1.3 |

Thus, as can be readily seen from the examples, the utilization of an organic diluent comprised of a saturated higher chlorinated aliphatic hydrocarbon mixed with the symmetrical tetrachloroethane feed to a catalytic oxidation zone in accordance with this invention produces surprisingly high yields of perchloroethylene and trichloroethylene during such reaction with low burning.

While the invention has been described with reference to certain specific embodiments thereof, it is not intended that the invention be so limited except insofar as appears in the accompanying claims.

This application is a continuation-in-part of co-pending U.S. application Serial Number 612,364 filed September 27, 1956, now U.S. Patent No. 2,914,575.

We claim:

1. In a method of producing perchloroethylene by feeding gaseous symmetrical tetrachloroethane and elemental oxygen to a catalytic reaction zone maintained at a temperature sufficient to produce perchloroethylene, the improvement comprising feeding with the gaseous tetrachloroethane feed a quantity of a higher chlorinated saturated aliphatic hydrocarbon in an amount ranging between 5 and 50 percent by weight of the tetrachloroethane feed.

2. In a method of producing perchloroethylene by feeding gaseous symmetrical tetrachloroethane and oxygen to a catalytic reaction zone maintained at a temperature sufficient to produce perchloroethylene, the improvement comprising feeding with said symmetrical tetrachloroethane between 5 and 50 percent by weight pentachloroethane.

3. In a method of producing perchloroethylene by feeding gaseous symmetrical tetrachloroethane and oxygen to a catalytic reaction zone maintained at a temperature sufficient to produce perchloroethylene from the symmetrical tetrachloroethane, the improvement comprising feeding a higher chlorinated saturated aliphatic $C_2$ hydrocarbon having 5 to 6 chlorine atoms thereon in an amount ranging between 5 and 50 percent by weight of the tetrachloroethane feed to said reaction zone.

4. A method of producing perchloroethylene comprising passing gaseous symmetrical tetrachloroethane, oxygen, and a higher chlorinated saturated $C_2$ hydrocarbon having 5 to 6 chlorine atoms thereon through an elongated tubular reactor having a metal halide catalyst contained therein, maintaining said catalyst at a temperature sufficient to cause a reaction between the oxygen and the tetrachloroethane to produce perchloroethylene, while providing in the reaction gas stream between 5 and 50 percent by weight of said higher chlorinated saturated $C_2$ hydrocarbon basis the tetrachloroethane in the reaction stream.

5. A method of producing perchloroethylene comprising feeding gaseous symmetrical tetrachloroethane, oxygen, and a higher chlorinated saturated $C_2$ hydrocarbon having 5 to 6 chlorine atoms thereon into a catalytic reaction zone maintained at a temperature between 570° F. and 930° F., while providing in the reaction zone between 5 and 50 percent by weight of said higher chlorintde saturated $C_2$ hydrocarbon basis the tetrachloroethane feed.

6. A method of producing perchloroethylene comprising feeding gaseous symmetrical tetrachloroethane, oxygen, and pentachloroethane to a catalytic reaction zone maintained at a temperature between 570° F. and 930° F. to thereby produce perchloroethylene therein, said pentachloroethane being between 5 and 50 percent by weight basis the tetrachloroethane feed.

References Cited in the file of this patent

UNITED STATES PATENTS

| 2,547,139 | Randall | Apr. 3, 1951 |
| 2,610,215 | Vanharen | Sept. 9, 1952 |
| 2,914,576 | Vancamp et al. | Nov. 24, 1959 |